US007288850B2

(12) United States Patent
Hicks et al.

(10) Patent No.: US 7,288,850 B2
(45) Date of Patent: Oct. 30, 2007

(54) SYSTEM AND APPARATUS FOR EMERGENCY BACKUP POWER GENERATION

(76) Inventors: Michael F. Hicks, P.O. Box 165, Metaline, WA (US) 99152; Larry P. Meyers, P.O. Box 207, Metaline, WA (US) 99152

( * ) Notice: Subject to any disclaimer, the term of this patent is extended or adjusted under 35 U.S.C. 154(b) by 138 days.

(21) Appl. No.: 11/321,417

(22) Filed: Dec. 29, 2005

(65) Prior Publication Data

US 2007/0152453 A1 Jul. 5, 2007

(51) Int. Cl.
*B60K 11/00* (2006.01)
*F03D 7/04* (2006.01)

(52) U.S. Cl. ............................. 290/44; 290/55; 416/17; 415/3.1

(58) Field of Classification Search ................. 290/43, 290/44, 54, 55; 416/17, 108; 415/3.1, 4.1
See application file for complete search history.

(56) References Cited

U.S. PATENT DOCUMENTS

| 1,523,295 | A | * | 1/1925 | Ryan ........................... 415/4.2 |
| 3,721,290 | A | * | 3/1973 | Butler, Jr. ..................... 165/85 |
| 4,031,405 | A | * | 6/1977 | Asperger ..................... 290/55 |
| 4,047,834 | A | * | 9/1977 | Magoveny et al. ........ 415/53.1 |
| 4,134,708 | A | * | 1/1979 | Brauser et al. ................ 415/30 |
| 4,474,529 | A | * | 10/1984 | Kinsey ......................... 415/4.2 |
| 4,494,007 | A | * | 1/1985 | Gaston ......................... 290/44 |
| 4,551,631 | A | * | 11/1985 | Trigilio ........................ 290/55 |
| 4,606,697 | A | * | 8/1986 | Appel .......................... 415/4.4 |
| 4,609,827 | A | * | 9/1986 | Nepple ......................... 290/44 |
| 6,448,669 | B1 | * | 9/2002 | Elder ........................... 290/54 |
| 6,666,650 | B1 | * | 12/2003 | Themel .................... 416/200 R |
| 6,710,469 | B2 | * | 3/2004 | McDavid, Jr. ................ 290/55 |
| 6,840,738 | B1 | * | 1/2005 | Swanberg ..................... 416/17 |
| 7,211,905 | B1 | * | 5/2007 | McDavid, Jr. ................ 290/44 |

* cited by examiner

*Primary Examiner*—Nicholas Ponomarenko
(74) *Attorney, Agent, or Firm*—Reidlaw, L.L.C.; John S. Reid (57) ABSTRACT

An emergency backup power generation system includes a housing comprising a main body portion, a top cap, and a bottom cap. Inner and outer surfaces and the main body portion, the top cap, and the bottom cap define a generally hollow interior volume within the inner surface. A shaft within the housing is substantially perpendicular to the top cap and the bottom cap about a rotational axis. A plurality of air guides affixed to the outer surface of the housing are adjacent openings in the main body portion to admit and direct moving air. One or more vanes are coupled to the shaft and rotatable within the housing. An electrical generator is coupled to the shaft such that the electrical generator is operable to generate electrical power when moving air impinges on the vanes to thereby cause the shaft to rotate within the interior volume of the housing.

16 Claims, 8 Drawing Sheets

SYSTEM AND APPARATUS FOR EMERGENCY BACKUP POWER GENERATION

BACKGROUND

This invention relates to improvements in the field of power generation. In particular, this invention relates to an improved system and apparatus for generating emergency back-up power from wind.

Many power back-up generation systems are available to home and commercial markets. Indeed, the complex systems available to commercial entities are well developed, complex, and often very expensive. In particular, prior back-up systems have usually comprised some form of internal-combustion powered electrical generator combined with various power interruption detection systems. A significant disadvantage of such systems is the requirement for a fuel source, which requires periodic monitoring to determine viability. That is, fuels can easily become contaminated by water intrusion. Fuels such as propane and natural gas can escape and might therefore leave the system without fuel. Furthermore, internal-combustion back-up generators require frequent testing and maintenance to guarantee operability in the case of an emergency.

There are several conditions that limit the usability of internal combustion back-up power generation systems. Such systems cannot be operated in remote locations where fuel is not readily available, or in locations that have unsuitable environmental conditions such as extreme heat or cold. Other back-up systems such as photo-voltaic solar cells have similar limitations with regard to environmental conditions, and many such cells are rather fragile making them unsuitable for field operation. It would be desirable therefore, to provide advancements to the art that overcome these and other disadvantages.

SUMMARY

According to an embodiment of the present invention, an emergency backup power generation apparatus comprises a housing comprising a main body portion, a top cap, and a bottom cap. The housing is defined by an inner surface and an outer surface, the main body portion, the top cap, and the bottom cap define a generally hollow interior volume within the inner surface. A plurality of openings are defined within the main body portion. A shaft is disposed at least partially within the housing, wherein the shaft is substantially perpendicular to and rotatably disposed between the top cap and the bottom cap about a rotational axis. A plurality of air guides are affixed to the outer surface of the housing, each air guide being affixed adjacent an associated opening in the main body portion. One or more vanes are coupled to the shaft and substantially perpendicular to the rotational axis of the shaft to thereby enable the vanes to be rotatable within the housing, and an electrical generator is coupled to the shaft such that the electrical generator is operable to generate electrical power when moving air impinges on the vanes thereby causing the shaft to rotate within the interior volume of the housing.

According to another embodiment, a system for wind-based emergency backup power generation comprises wind-powered generator means, power source means coupled to the wind power generator means, emergency power storage means, and power conversion means for converting power generated by the wind powered generator means into power usable by an electrical service box.

According to still another embodiment, a method for generating emergency backup power from wind comprises receiving a moving non-viscous fluid to a wind-powered electrical generator. In the present embodiment, the wind-powered electrical generator comprises a housing including a main body portion, a top cap, and a bottom cap, wherein the housing is defined by an inner surface and an outer surface, the main body portion, the top cap, and the bottom cap define a generally hollow interior volume within the inner surface. A shaft is disposed at least partially within the housing, wherein the shaft is substantially perpendicular to and rotatably disposed between the top cap and the bottom cap about a rotational axis. A plurality of air guides are affixed to the outer surface of the housing, each air guide being affixed adjacent an associated opening in the main body portion. One or more vanes are coupled to the shaft and substantially perpendicular to the rotational axis of the shaft, to thereby enable the vanes to be rotatable within the housing, and an electrical power generator is coupled to the shaft. The method further comprises directing the moving fluid via the air guides to the one or more vanes, wherein the vanes generate a rotational force when the moving fluid impinges on the vanes to thereby cause the shaft to rotate within the interior volume of the housing, coupling the rotational force of the vanes to the generator apparatus, and generating power from the rotational force.

DETAILED DESCRIPTION

Figure 1:
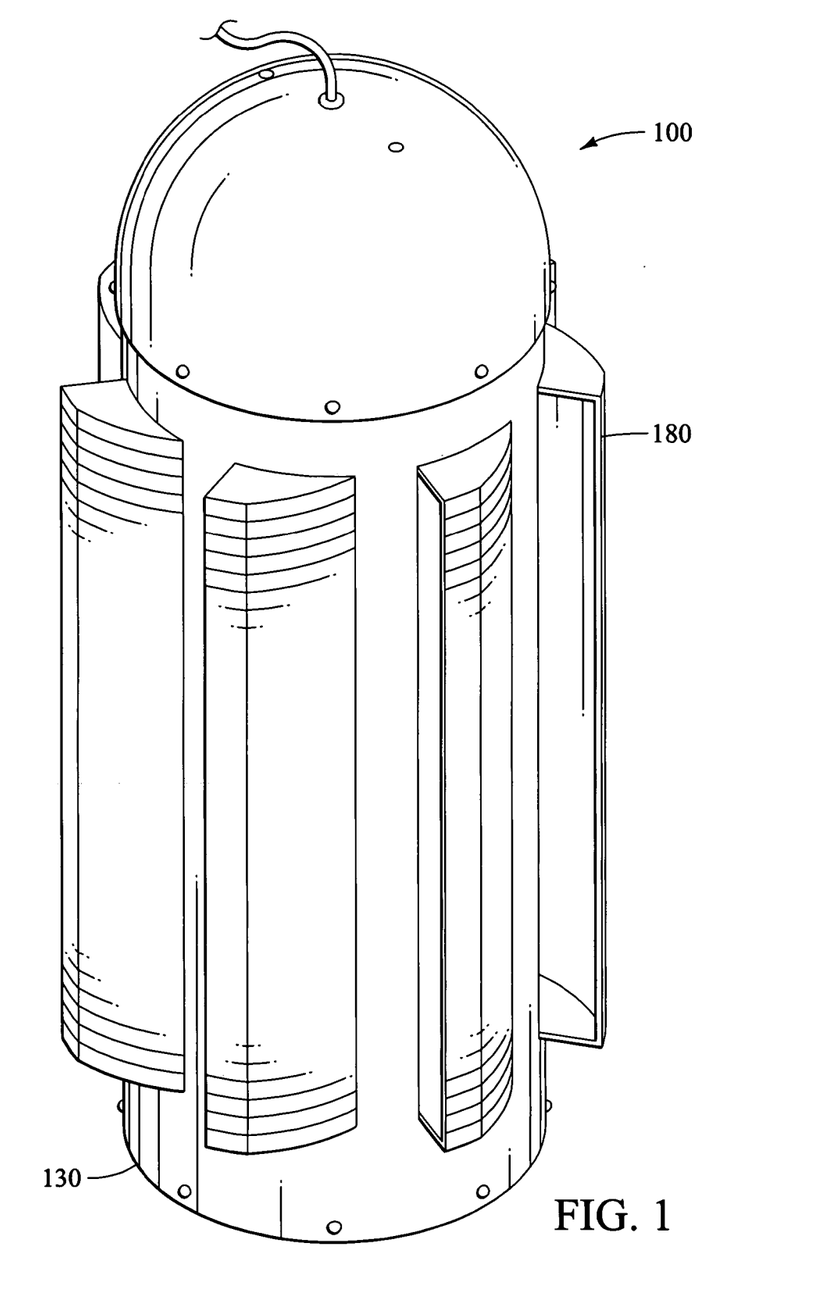
FIG. 1 is a perspective view depicting an emergency backup power generation apparatus, illustrating an embodiment of the present invention.

FIG. 1 is a perspective view depicting an emergency backup power generation apparatus 100, illustrating an embodiment of the present invention. As shown in FIG. 1, the emergency backup power generation apparatus 100 includes a housing 130 that has a plurality of air guides 180 affixed along a circumference of an outer surface of the housing 130. Other features of the emergency backup power generation apparatus 100 will now be described in further detail in the following descriptions of FIGS. 2-4.

Figure 2:
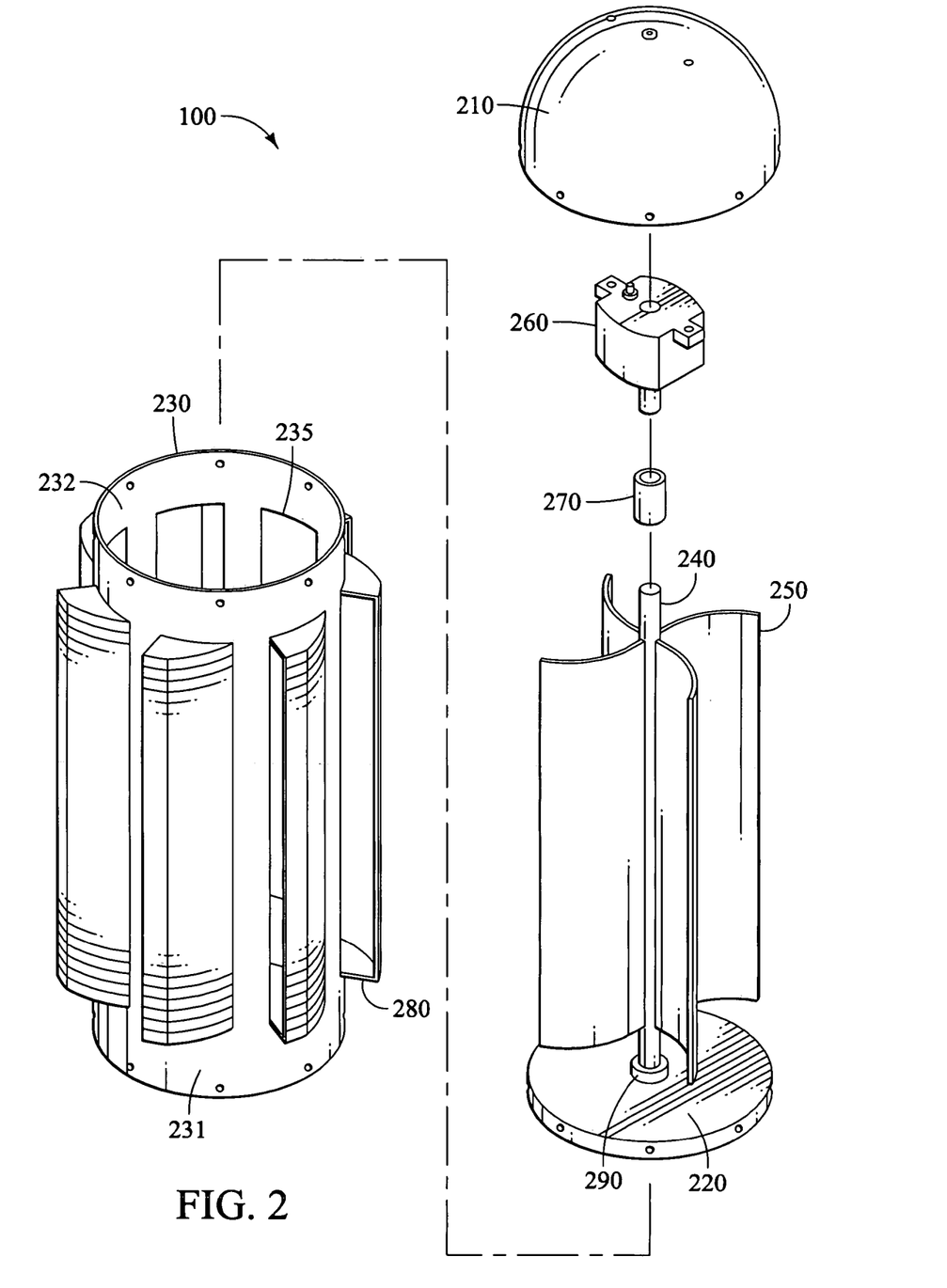
FIG. 2 is an exploded perspective view of the emergency backup power generation apparatus of FIG. 1.

FIG. 2 is an exploded perspective view of the emergency backup power generation apparatus 100 of FIG. 1. As shown in FIG. 2, the emergency backup power generation apparatus 100 includes a housing 130 that comprises a main body portion 230 a top cap 210, and a bottom cap 220. In an embodiment, the housing 130 is defined by an inner surface 232 and an outer surface 231. In another embodiment, the housing is composed of a material selected from the group consisting of plastic, metal, and water heater tank housing. In still another embodiment, the main body portion 230, the top cap 210, and the bottom cap 220 define a generally hollow interior volume within the inner surface 232. In yet another embodiment, the main body portion 230 is generally cylindrical in shape, such that the main body portion 230, the top cap 210, and the bottom cap 220 define a generally cylindrical interior volume within the inner surface. The main body portion 230, top 210 cap and bottom cap 220 are affixed to each other by conventional means as will by recognized by the skilled practitioner. For example, in one embodiment, the main body portion 230, top cap 210 and the bottom cap 220 are structurally coupled with fasteners such as, but not limited to, nuts and bolts, rivets, welds, clamps and the like. In another embodiment, the main body portion 230, top cap 210 and the bottom cap 220 are coupled such that any seams between the components are substantially air-tight. In one embodiment, the top cap 210 is substantially dome shaped.

As shown in FIG. 2, a plurality of openings 235 are defined within the main body portion 230. In one embodiment, the openings 235 in the main body portion are substantially elongated along a vertical axis of the main body portion. In another embodiment, the openings 235 are substantially rectangular.

Again referring to FIG. 2, a shaft 240 is disposed at least partially within the housing 130. In one embodiment, the shaft 240 is substantially perpendicular to and rotatably disposed between the top cap 210 and the bottom cap 220 about a rotational axis. One embodiment further comprises a top bearing 270 supported by the top cap 210, and an end bearing 290 supported by the bottom cap 220. In the present embodiment, the shaft 240 is supported by the top bearing 270 and the bottom bearing 290. In one embodiment, the rotational axis is defined along an axis of the shaft 240, and is located substantially at the physical center of the housing 130. In one embodiment, the shaft 240, the top bearing 270 and the end bearing 290 are composed of a material such as, but not limited to, metal, plastic, polymers, fiberglass, and various composite materials as will be recognized by the skilled practitioner. In still another embodiment, the top bearing is a mechanical coupler that couples the shaft 240 to an electrical generator 260.

FIG. 2 shows a plurality of air guides 280 that are affixed to the outer surface 231 of the housing 130. In one embodiment, each air guide 280 is affixed adjacent to an associated opening 235 in the main body portion 230. In another embodiment, the air guide is defined by an air guide housing at least a portion of which is defined by a curvilinear surface that is operable to directing moving air, such as wind, into an opening 235 of the main body portion 230. A skilled practitioner will recognize that there are many equivalent air guide 280 shapes and configurations that will be within the scope of the present invention. In one embodiment, the air guides are composed of a material such as, but not limited to, metal, plastic, polymers, fiberglass, and various composite materials, as will again be recognized by the skilled practitioner.

Figure 4:
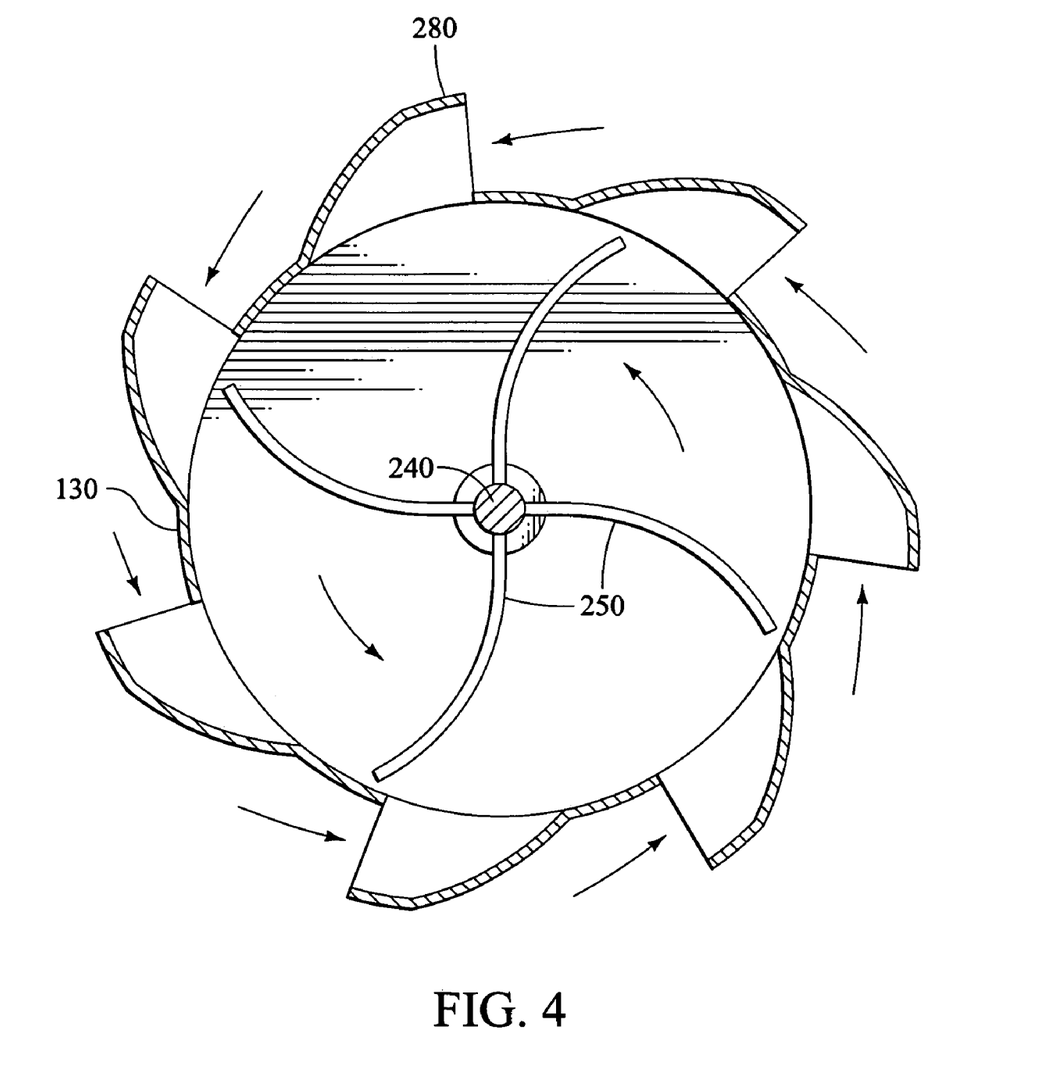
FIG. 4 is a top view depicting the emergency backup power generation apparatus of FIGS. 1-3.

As shown in FIG. 2, one or more vanes 250 are coupled to the shaft 240 and substantially perpendicular to the rotational axis of the shaft 240. In one embodiment, each of the one or more vanes comprise a curvilinear surface. In one example, the curvilinear surface is oriented with a clockwise curvature from the perpendicular rotational axis of the shaft 240. In yet another example, the curvilinear surface is oriented with a counter-clockwise curvature from the perpendicular rotational axis of the shaft 240, as depicted in FIG. 4. In one embodiment, the vanes are composed of a material such as, but not limited to, metal, plastic, natural or manufactured wood, polymers, fiberglass, and various composite materials, as will be recognized by the skilled practitioner.

FIG. 2 shows an electrical generator 260 coupled to the shaft 240. In one embodiment, the electrical generator is an alternator. In another embodiment, the electrical generator is operable to generate electrical power when moving air external to the housing 130 is directed by the air guides 280 onto the vanes 250, thereby causing the shaft 240 to rotate within the interior volume of the housing 130. In another embodiment, (not shown) the generator 260 is electrically coupled to external devices, such as for example, energy storage and transmission devices. In one embodiment, the electrical generator 260 includes an internal bearing assembly that is operable as the top bearing 270 for the case when the top bearing 270 is a mechanical coupler as described above. In another embodiment, the electrical generator 240 includes a transmission (not shown) that allows force to be variably coupled from the shaft 240 to the generator.

Figure 3:
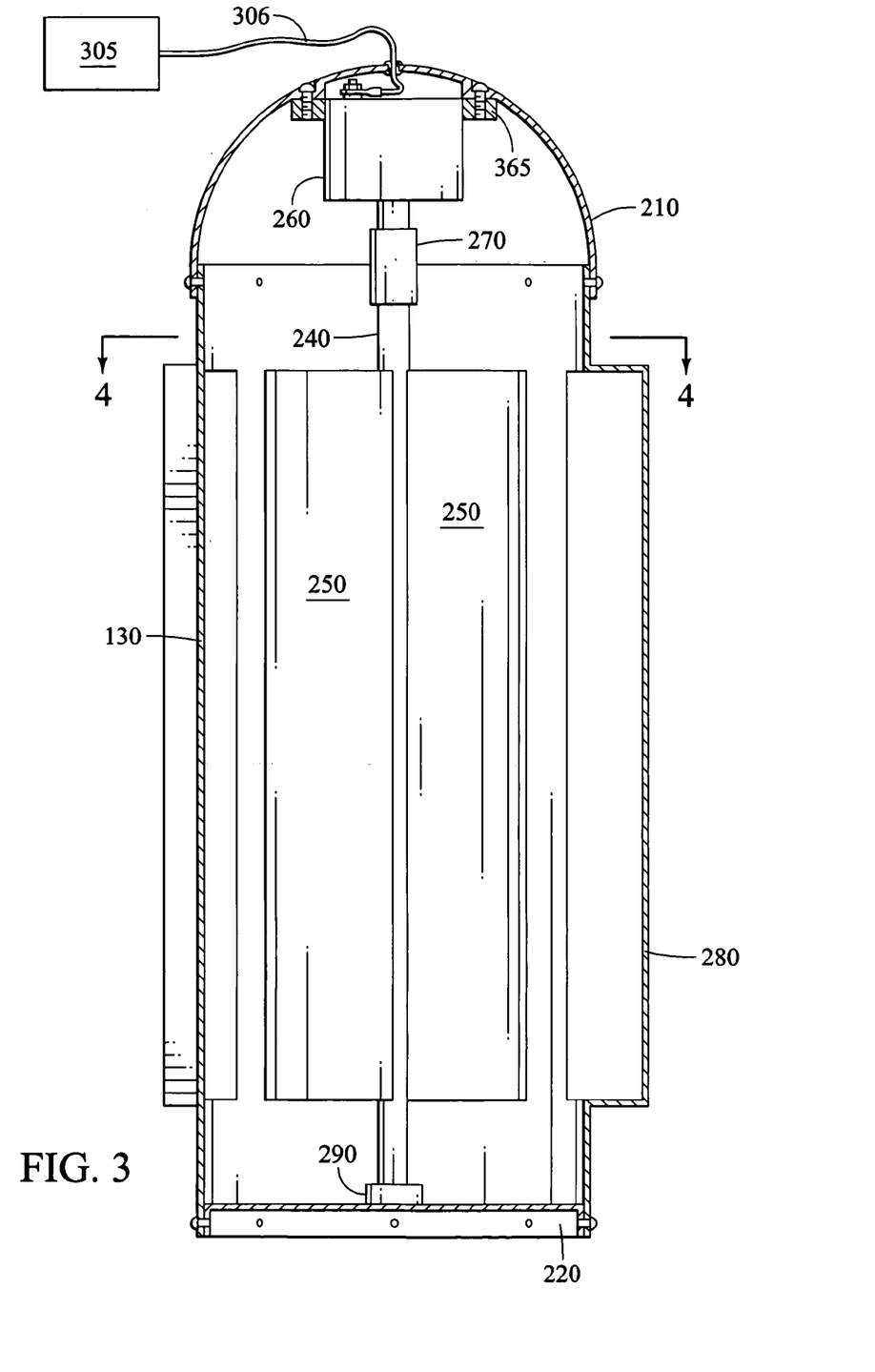
FIG. 3 is a cross-sectional view of the emergency backup power generation apparatus of FIGS. 1 and 2.

FIG. 3 is a cross-sectional view of the emergency backup power generation apparatus of FIGS. 1 and 2. FIG. 3 shows additional embodiments of the emergency backup power generation apparatus 100 that may not be readily apparent from FIGS. 1 and 2.

As shown in FIG. 3, generator 260 is affixed to the top cap 210 via a support member 365 that supports the electrical generator 260 in fixed relationship to the housing 130. In one embodiment, the support member 365 comprises a mechanical assembly affixed to the top cap 210 whereby a fastener, such as for example a bolt, allows the generator to be structurally affixed to the top cap 210. In another embodiment, the support member 365 is a casting that is integral to the top cap 210. It will be appreciated that the generator 260 can also be affixed to the top of the cap 210 outside of the housing 130.

Also shown in FIG. 3 is an external device 305 electrically coupled to the generator 260 via an electrically conductive medium 306. In one embodiment, the external device 305 is an energy storage device such as a battery. In another embodiment, the external device 305 is a power source, such as for example a utility power line or another generator. In yet another embodiment, the external device 305 is a power conversion device for converting power generated by the generator 260 into power usable by an electrical service box. In yet another embodiment, the external device 305 is a power signal conditioning device such as a power line filter, an AC/DC power inverter, or a DC/DC converter.

The sectional view of FIG. 3 shows the two vanes 250 that are coupled to the shaft 240 and substantially perpendicular to the rotational axis of the shaft 240 between the top bearing 270 and the end bearing 290. As shown in FIG. 3, the end bearing 290 is centered in the housing 130, and structurally affixed to the bottom cap 220. As indicated in FIG. 3, a top view of the embodiment of FIG. 3 is shown in FIG. 4.

FIG. 4 is a top view depicting the emergency backup power generation apparatus of FIG. 3. As indicated in FIG. 3 by directional arrows, moving air is guided by the air guides 280 from the exterior to the interior of the housing 130 where the one or more vanes 250 are caused to rotate about the shaft 240. In one embodiment as shown in FIG. 3, in a plan view the air guides 280 are clockwise oriented on the outer surface of the housing 130 (i.e., oriented with the air inlet portions of each guide disposed in a clockwise direction from the air guide itself), and the curvilinear surface of the one or more vanes 250 are clockwise oriented such that moving air guided by the air guides 280 to the interior of the housing 130 causes the vanes 250 to rotate in a counter-clock wise direction. In another embodiment (not shown), the air guides 280 are counter-clockwise oriented on the outer surface of the housing 130 (i.e., oriented with the air inlet portions of each guide disposed in a counter-clockwise direction from the air guide itself), and the curvilinear surface of the one or more vanes 250 are counter-clockwise oriented such that moving air guided by the air guides 280 to the interior of the housing 130 causes the vanes 250 to rotate in a clockwise direction. It will be appreciated that regardless of the orientation of the air guides 280, if any wind is blowing, regardless of direction, some air will enter the housing 130 via the air guides having windward openings, and will press on vanes 250. Air will be exhausted from the inside of the housing via air guides having openings on the downwind (leeward) side.

In some embodiments, (discussed with reference to FIGS. 6-8), the housing 130 can have different cross-sectional geometries, such as, but not limited to, elliptical, rectangular and polygonal. In one embodiment, the housing 130 geometry is determined according to methods understood by those skilled in the art in order to maximize the power generation performance of the emergency backup power generation apparatus 100. In other embodiments, the housing 130 geometry is determined according to methods understood by those skilled in the art in order to realize other advantages, such as those related to durability, stability and suitability for specific locations.

Figure 5:
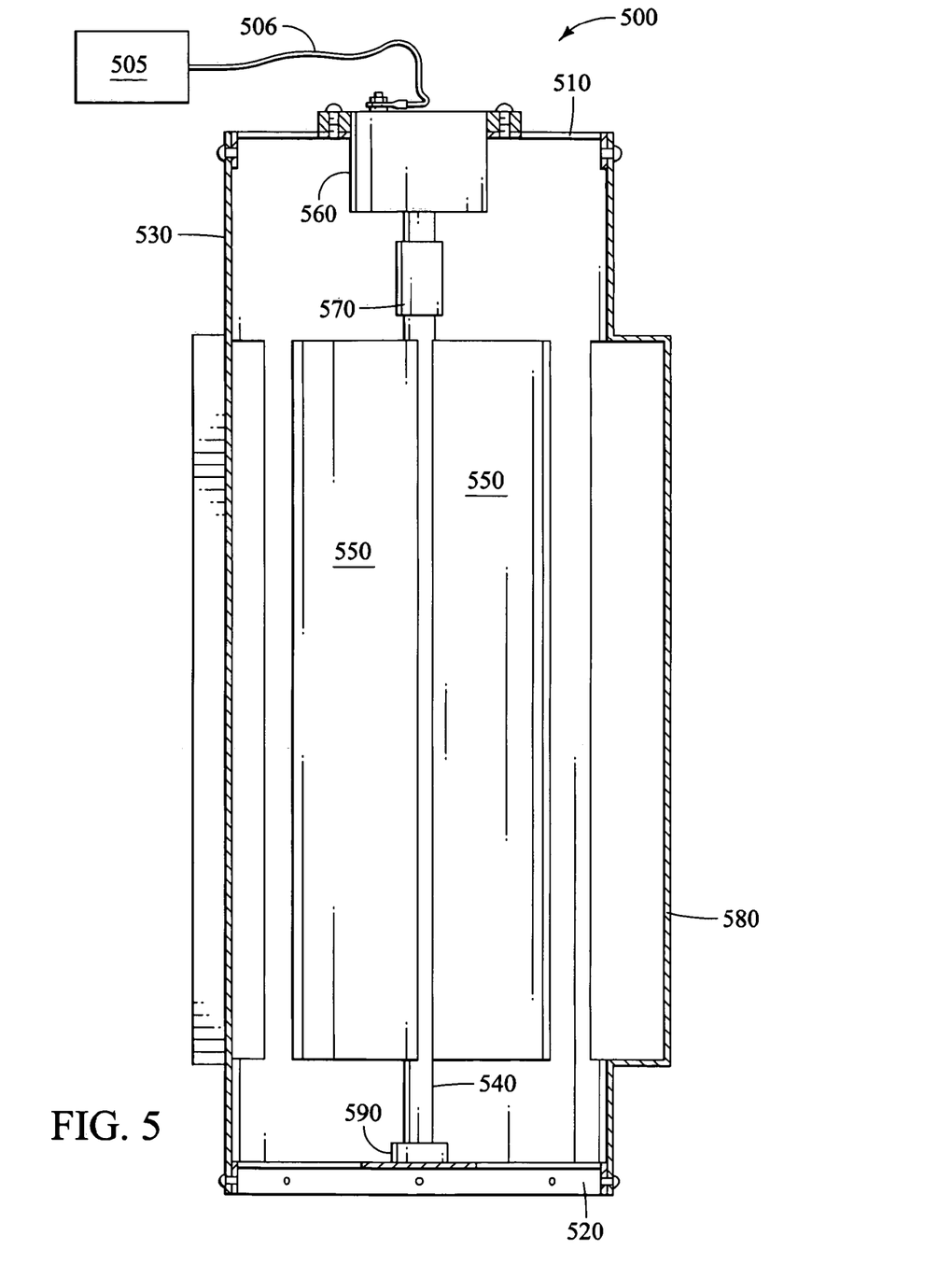
FIG. 5 is cross-sectional view of an emergency backup power generation apparatus, illustrating another embodiment of the present invention.

FIG. 5 is cross-sectional view of an emergency backup power generation apparatus 500, illustrating yet another embodiment of the present invention.

As shown in FIG. 5, a top cap 510 provides a structural support for a generator 560 in fixed relationship to a housing 530. In one embodiment, the generator 560 is structurally affixed to the top cap 510 with a fastener, such as for example a bolt. In another embodiment, the top cap 510 is an open frame or support members, such as for example a cross bar that provides a structural mount for the generator 560.

Also shown in FIG. 5 is an external device 505 electrically coupled to the generator 560 via an electrically conductive medium 506. In one embodiment, the external device 505 is an energy storage device such as a battery. In another embodiment, the external device 505 is a power source, such as for example, a utility power line or another generator. In yet another embodiment, the external device 505 is a power conversion device for converting power generated by the generator 560 into power usable by an electrical service box. In yet another embodiment, the external device 505 is a power signal conditioning device such as a power line filter, an AC/DC power inverter or a DC/DC converter.

The sectional view of FIG. 5 also shows two vanes 550 that are coupled to a shaft 540 and substantially perpendicular to a rotational axis of the shaft 540 between a top bearing 570 and an end bearing 590. As shown in FIG. 5, the end bearing 590 is centered in the housing 530, and structurally affixed to a bottom cap 520. In one embodiment, the bottom cap 520 is an open frame of support members such as, for example, a cross bar that provides a structural mount for the end bearing 590.

Figure 6:
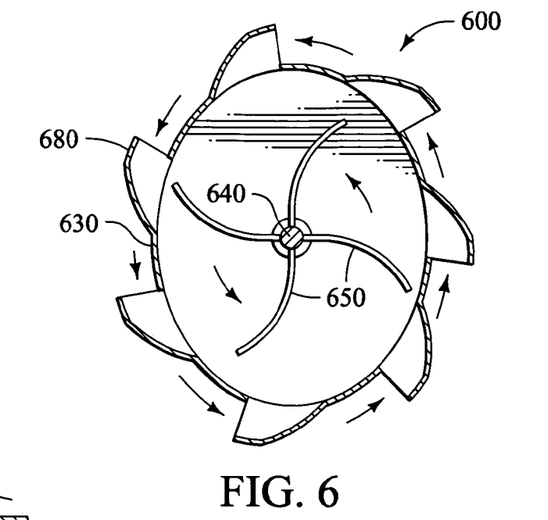
FIG. 6 is a top view depicting the emergency backup power generation apparatus, illustrating yet another embodiment of the present invention.
Figure 7:
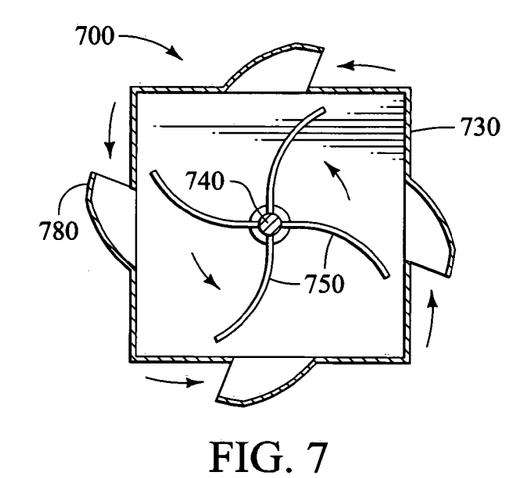
FIG. 7 is a top view depicting the emergency backup power generation apparatus, illustrating still another embodiment of the present invention.
Figure 8:
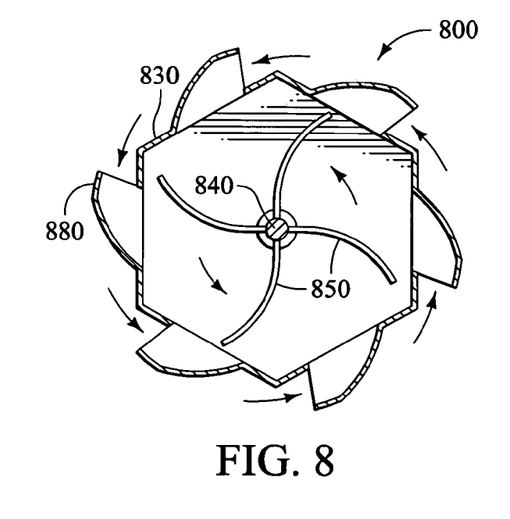
FIG. 8 is a top view depicting the emergency backup power generation apparatus, illustrating yet another embodiment of the present invention.

FIGS. 6-8 illustrate sectional plan views of an emergency backup power generation apparatus having different housing geometries.

FIG. 6 is a top plan view depicting an emergency backup power generation apparatus, illustrating yet another embodiment of the present invention. FIG. 6 shows an emergency backup power generation apparatus 600 generally according to one or more of the embodiments discussed with reference to FIGS. 1-5, and that further comprises a generally elliptical housing 630. As indicated in FIG. 6 by directional arrows, moving air is guided by the air guides 680 from the exterior to the interior of the housing 630 where the one or more vanes 650 are caused to rotate about the shaft 640. In one embodiment as shown in FIG. 6, the air guides 680 are clockwise oriented on the outer surface of the housing 630, and the curvilinear surface of the one or more vanes 650 are clockwise oriented such that moving air guided by the air guides 680 to the interior of the housing 630 causes the vanes 650 to rotate in a counter-counter-clockwise direction. In another embodiment (not shown), the air guides 680 are counter-clockwise oriented on the outer surface of the housing 630, and the curvilinear surface of the one or more vanes 650 are counter-clockwise oriented such that moving air guided by the air guides 680 to the interior of the housing 630 causes the vanes 650 to rotate in a clockwise direction.

FIG. 7 is a plan view depicting an emergency backup power generation apparatus, illustrating yet another embodiment of the present invention. FIG. 7 shows an emergency backup power generation apparatus 700 generally according to one or more of the embodiments discussed with reference to FIGS. 1-5, and that further comprises a generally rectangular housing 730. As indicated in FIG. 7 by directional arrows, moving air is guided by the air guides 780 from the exterior to the interior of the housing 730 where the one or more vanes 750 are caused to rotate about the shaft 740. In one embodiment as shown in FIG. 7, the air guides 780 are clockwise oriented on the outer surface of the housing 730, and the curvilinear surface of the one or more vanes 750 are clockwise oriented such that moving air guided by the air guides 780 to the interior of the housing 730 causes the vanes 750 to rotate in a counter-clockwise direction. As discussed above other embodiments consider that the air guides 780 are counter-clockwise oriented on the outer surface of the housing 730, and the curvilinear surface of the one or more vanes 750 are counter-clockwise oriented such that moving air guided by the air guides 780 to the interior of the housing 730 causes the vanes 750 to rotate in a clockwise direction.

FIG. 8 is a plan view depicting an emergency backup power generation apparatus, illustrating yet another embodiment of the present invention. FIG. 8 shows an emergency backup power generation apparatus 800 generally according to one or more of the embodiments discussed with reference to FIGS. 1-5, and that further comprises a generally polygonal housing 830. As indicated in FIG. 8 by directional arrows, moving air is guided by the air guides 880 from the exterior to the interior of the housing 830 where the one or more vanes 850 are caused to rotate about the shaft 840. In one embodiment as shown in FIG. 8, the air guides 880 are clockwise oriented on the outer surface of the housing 830, and the curvilinear surface of the one or more vanes 850 are clockwise oriented such that moving air guided by the air guides 880 to the interior of the housing 830 causes the vanes 850 to rotate in a counter-clockwise direction. As discussed above other embodiments consider that the air guides 880 are counter-clockwise oriented on the outer surface of the housing 830, and the curvilinear surface of the one or more vanes 850 are counter-clockwise oriented such that moving air guided by the air guides 880 to the interior of the housing 830 causes the vanes 850 to rotate in a clockwise direction.

Figure 9:
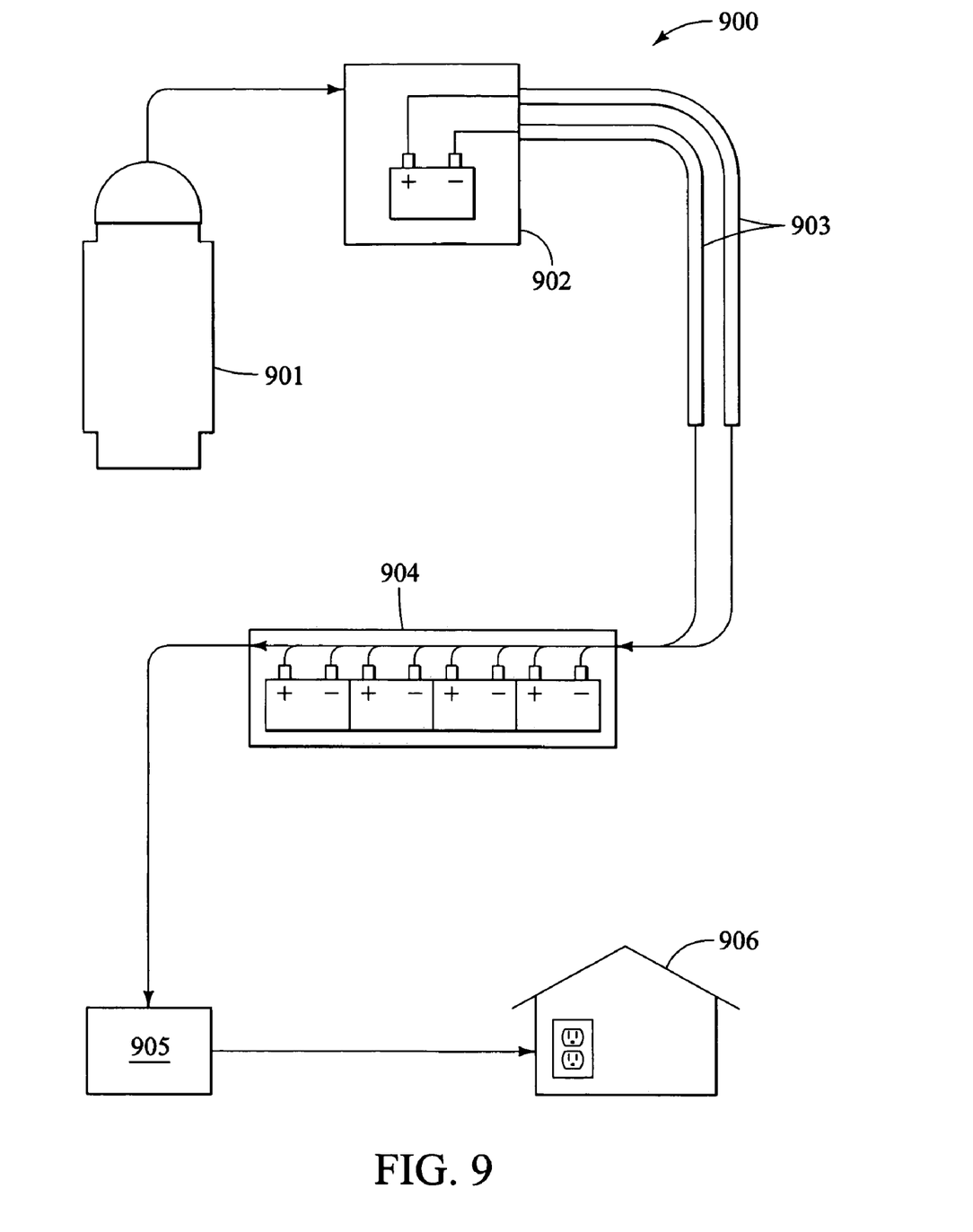
FIG. 9 is a schematic diagram of a system for wind-based emergency backup power generation, illustrating still another embodiment of the present invention.

FIG. 9 is a schematic diagram of a system for wind-based emergency backup power generation, illustrating still another embodiment of the present invention. FIG. 9 shows the wind-based emergency backup power generation system comprising a emergency backup power generator 901, a power source 902, a power transmission line 903, an emergency power storage device 904, a power conversion device 905, and a power distribution panel 906 (e.g., an electrical service box). In FIG. 9, the emergency backup power generator 901 is shown electrically coupled to the power source 902. The power source 902 is shown electrically coupled to the power transmission line 903, which itself is shown electrically coupling power to the emergency power storage device 904. The power conversion device 905 is shown electrically coupled to the emergency power storage device 904 and the power distribution panel 906.

Power flow is suggested by FIG. 9 such that power generated by the emergency backup power generator 901 is coupled to the power source 902, which then delivers the generated power to the emergency power storage device 904 via power transmission line 903. The power conversion device 905 then couples stored power from the emergency power storage device 904 to the power distribution panel 906.

In one embodiment, the emergency backup power generator 901 is an emergency backup power generation apparatus according to one or more of the embodiments described with reference to FIGS. 1-8. Generally, the emergency backup power generator 901 is a device that generates power from captured moving air.

In another embodiment, the power source 902 is any device capable of supplying power, such as for example, a power utility, a generator, a battery and the like. In yet another embodiment, the power transmission line 903 is any conductive medium suitable for conveying power between two devices. In one embodiment, the power transmission line 903 is a copper or aluminum cable approved for power transmission by a governmental regulatory agency.

In still another embodiment, the emergency power storage device 904 is any device suitable for storing power. In one embodiment, the emergency power storage device 904 includes one or more batteries. In another embodiment, the multiple batteries are electrically coupled together such that energy is stored. In yet another embodiment, the batteries can include lead acid cells, lithium cells, lithium-ion cells, alkaline cells, Nickel Metal Hydride cells (NiMH), Nickel Cadmium cells (NiCad), Zinc-air cells, and the like. In still another embodiment, the emergency power storage device 904 can include an inertial energy storage device such as a flywheel or an electric field energy storage device such as a capacitor.

In another embodiment, the power conversion device 905 is any device for converting power generated by the generator 560 into power usable by an electrical service box. In yet another embodiment, the power conversion device 905 is a power signal conditioning device such as a power line filter, an AC/DC power inverter and a DC/DC converter. In one embodiment, the power conversion device is capable of determining that an emergency power backup system is activated. In another embodiment, the power conversion device is capable of activating an emergency power backup system.

In an embodiment, the power distribution panel 906 is an electrical service box of a building such as a home, garage, shop or other structure. In one embodiment, the power distribution panel 906 includes hardware and software for detecting a loss of or interruption of power in order to activate an emergency power backup system.

Figure 10:
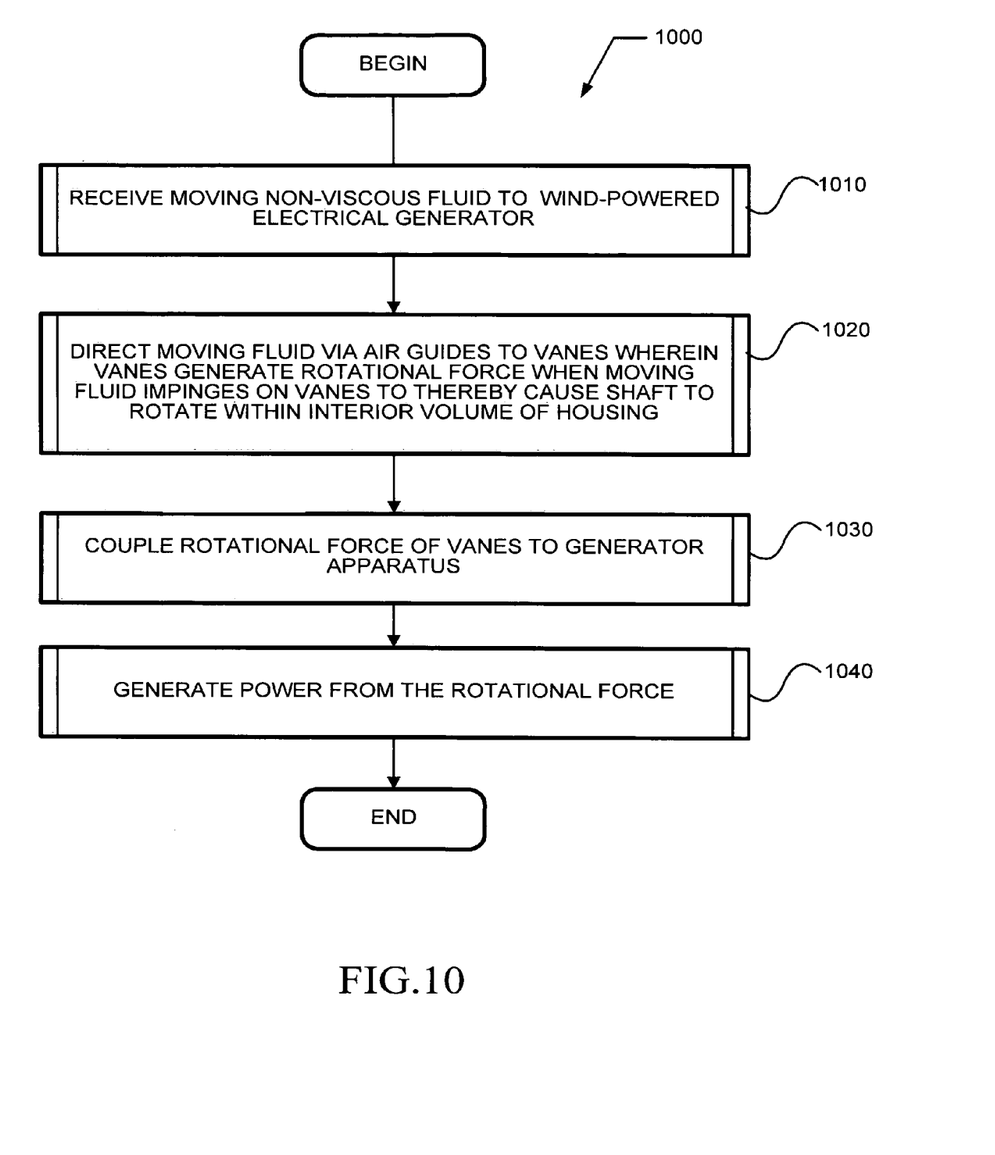
FIG. 10 is flow diagram illustrating a method, according to an embodiment of the present invention.

FIG. 10 is a flow diagram depicting a method, in accordance with another embodiment of the present invention. FIG. 10 illustrates a method 1000 generating emergency backup power from wind. In one embodiment, method 1000 is implemented with components of the exemplary emergency backup power generation apparatus and system according to one or more of the embodiments described with reference to FIGS. 1-9. Method 1000 begins in step 1010. Various steps of the method 1000 are described with respect to an emergency backup power generation apparatus performing the method. In some implementations, certain steps of method 1000 are combined, performed simultaneously or in a different order, without deviating from the objective of method 1000 or producing different results.

In step 1010, a moving non-viscous fluid is received to a wind-powered electrical generator. Step 1010 can occur at any time that a moving fluid is available for receiving. In one embodiment, the wind-powered electrical generator comprises a housing including a main body portion, a top cap, and a bottom cap. The housing is defined by an inner surface and an outer surface. The main body portion, the top cap, and the bottom cap define a generally hollow interior volume within the inner surface, and a plurality of openings are defined within the main body portion.

In one embodiment, a shaft is disposed at least partially within the housing. The shaft is substantially perpendicular to, and rotatably disposed between, the top cap and the bottom cap about a rotational axis. In another embodiment, a plurality of air guides are affixed to the outer surface of the housing and each air guide is affixed adjacent an associated opening in the main body portion. In yet another embodiment, one or more vanes are coupled to the shaft and substantially perpendicular to the rotational axis of the shaft to thereby enable the vanes to be rotatable within the housing. In still another embodiment, an electrical power generator is coupled to the shaft.

In step 1020, the moving fluid is directed via one or more of the air guides to the one or more vanes such that the vanes generate a rotational force when the moving fluid impinges on the vanes and thereby causes the shaft affixed to the vanes to rotate within the interior volume of the housing. In one embodiment, the moving fluid is directed at any time that the moving fluid occurs at an opening of the air guides. In one embodiment, the direction of rotation of the shaft is counter-clockwise. In another embodiment, the direction of rotation of the shaft is clockwise.

In step 1030, the rotational force of the vanes is coupled to the generator apparatus. In one embodiment, the rotational force of the vanes is coupled at any time that the shaft is caused to rotate. In another embodiment, the rotational force of the shaft is coupled to the generator via a transmission. In another embodiment, a clutch of a transmission interrupts the coupling of the force to the generator until a predetermined force is attained or alternatively a predetermined force is exceeded.

In step 1040, power is generated from the coupled rotational force. In one embodiment, the power is generated at any time that the power is coupled to the generator. In another embodiment, the power generated is alternating current. In yet another embodiment, the power generated is direct current.

An embodiment further comprises providing the generated power to an emergency power storage unit. Yet another embodiment comprises storing the provided power in an emergency power storage unit. Still another embodiment comprises delivering the stored electrical power from the emergency power storage unit to a load. In one embodiment, a load comprises an electrical service box of a building.

Another embodiment further comprises providing the generated power to a power signal conditioning device. In one embodiment, the power signal conditioning device is a device such as, for example, a power line filter, an AC/DC power inverter and a DC/DC converter. Still another embodiment comprises conditioning the generated power with the power signal conditioning device into power usable by an electrical service box. Yet another embodiment includes providing the conditioned generated power to an electrical service box. In an embodiment, the conditioned generated power is provided to the electrical service box responsive to a determination that an emergency power backup system is activated.

It is understood that the invention can be embodied in other specific forms not described that do not depart from its spirit or essential characteristics. The described embodiments are to be considered in all respects only as illustrative and not restrictive, the scope of the invention being defined by the appended claims and equivalents thereof.

We claim:

1. An emergency backup power generation apparatus, comprising:
    a housing comprising a main body portion, a top cap, and a bottom cap, and wherein:
    the housing is defined by an inner surface and an outer surface;
    the main body portion, the top cap, and the bottom cap define a generally hollow interior volume within the inner surface; and
    a plurality of openings are defined within the main body portion;
    a shaft disposed at least partially within the housing, wherein the shaft is substantially perpendicular to and rotatably disposed between the top cap and the bottom cap about a rotational axis;
    a plurality of air guides affixed to the outer surface of the housing, each air guide being affixed adjacent to an associated opening in the main body portion;
    one or more vanes coupled to the shaft and substantially perpendicular to the rotational axis of the shaft to thereby enable the vanes to be rotatable within the housing; and
    an electrical generator coupled to the shaft such that the electrical generator is operable to generate electrical power when moving air impinges on the vanes thereby causing the shaft to rotate within the interior volume of the housing.

2. The apparatus of claim 1, and further comprising a top bearing supported by the top cap, and end bearing supported by the end cap, and wherein the shaft is supported by the top bearing and the bottom bearing.

3. The apparatus of claim 1, and further comprising a support member supporting the electrical generator in fixed relationship to the housing.

4. The apparatus of claim 1, and wherein the openings in the main body portion are substantially elongated along the rotation axis.

5. The apparatus of claim 1, and wherein the housing is composed of a material selected from the group consisting of plastic, metal, and water heater tank housing.

6. The apparatus of claim 1, and wherein the one or more vanes comprise a curvilinear surface.

7. The apparatus of claim 6, and wherein the curvilinear surface is oriented with a counter-clockwise curvature from the rotational axis of the shaft.

8. The apparatus of claim 6, and wherein the curvilinear surface is oriented with a clockwise curvature from the rotational axis of the shaft.

9. The apparatus of claim 1 further comprising a power storage system operably coupled to the electrical power generator.

10. The apparatus of claim 9 wherein the power storage system comprises:
    a power source unit;
    an emergency power storage unit coupled to the power source unit; and
    a power inverter unit coupled to the emergency power storage unit.

11. The apparatus of claim 1, and wherein the main body portion is generally cylindrical in shape, such that the main body portion, the top cap, and the bottom cap define a generally cylindrical interior volume within the inner surface.

12. The apparatus of claim 1, and wherein the main body portion is generally eliptical in shape, such that the main body portion, the top cap, and the bottom cap define a generally ovoid cylindrical interior volume within the inner surface.

13. The apparatus of claim 1, and wherein the main body portion is polygonal, such that the main body portion, the top cap, and the bottom cap define a generally cylindrical polygonal interior volume within the inner surface.

14. The apparatus of claim 11, and wherein each of the plurality of air guides are affixed to a polygon face of the main body of the housing.

15. The apparatus of claim 1, and wherein the air guides are oriented clockwise on the outer surface of the housing.

16. The apparatus of claim 1, and wherein the air guides are oriented counter-clockwise on the outer surface of the housing.

* * * * *